United States Patent Office 3,365,479
Patented Jan. 23, 1968

3,365,479
(ALKOXYLMETHYL)ALKYL STANNANES AND THE CHLOROMETHYLATION THEREOF
Marcel Lefort, Lyon, France, assignor to Rhone-Poulenc S.A., Paris, France, a corporation of France
No Drawing. Filed July 20, 1964, Ser. No. 383,924
Claims priority, application France, July 24, 1963, 942,514
8 Claims. (Cl. 260—429.7)

ABSTRACT OF THE DISCLOSURE

Organostannanes of formula $R_nSn(CH_2OR')_{4-n}$, in which n is 2 or 3, and R and R' are the same or different alkyl, cycloalkyl or aralkyl radicals, are useful as intermediates and as catalysts; they may be used as drying catalysts for organopolysiloxanes in making stable organopolysiloxane solutions for use as coating compositions and in cross-linking silicone oils to give elastomers. They are also good modifying agents for oils. They can be made by a Grignard reaction between an organo-halogeno-stannane and a chloromethyl ether.

---

This invention relates to organostannane derivatives.
The invention provides organostannanes of the formula:

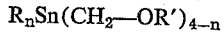

in which n is 2 or 3, and R and R' are alkyl, cycloalkyl or aralkyl radicals, the R and R' radicals not necessarily being the same.

Preferred compounds of the invention are those in which R and R' represent alkyl of up to 4 carbon atoms, cyclopentyl, methylcyclopentyl, cyclohexyl, methylcyclohexyl or benzyl. Still more preferably R is alkyl of up to 4 carbon atoms and R' is methyl or ethyl.

These new organostannanes are prepared, in accordance with a feature of the invention, by condensing an organohalogenostannane of formula: $R_nSnX_{4-n}$ (where X is a halogen atom, preferably chlorine or bromine) with 4–n molecular proportions of a chloromethylether of formula: $ClCH_2OR'$ under anhydrous conditions in the presence of magnesium and a cyclic ether chosen from tetrahydrofuran, tetrahydropyran and their homologues, preferably their methyl homologues, and hydrolyzing the reaction product. The magnesium is preferably activated with mercuric chloride. The reaction may be represented as follows:

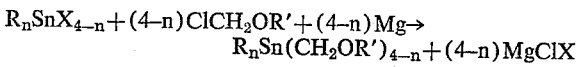

The process is carried out under the conditions usual in reactions involving organomagnesium compounds. Generally an excess of magnesium and of the chloromethylated ether is used over the quantity stoichiometrically required by the reaction given above.

The magnesium is ordinarily first introduced into the cyclic ether chosen as the reaction medium, an aliquot portion of chloromethylated ether is added and, when the reaction has begun, the organohalogenostannane and the remainder of the chloromethylated ether are separately and simultaneously added, the reaction mass being maintained at a temperature between 10° and 40° C., subsequently the reaction may optionally be brought to completion by heating the mixture under reflux. It is then sufficient to treat the reaction mass with water, with a dilute mineral acid or with a solution of an ammonium salt, and to isolate the organic fraction which, after the conventional washing and drying treatments, followed by purification (for example, by distillation), gives the desired organostannane ether.

The new organostannanes of the invention may be converted into the corresponding chloromethylated organostannanes by heating with acetyl chloride.

The new organostannanes also have an interesting catalytic activity, more especially on organosilicic polymers. Thus, when a small proportion thereof is added to an organopolysiloxane, the polymerization of the latter is accelerated, and the drying time of a coating produced therefrom reduced.

Using the new compounds, it is, moreover, possible to prepare organopolysiloxane solutions, the stability of which is higher than that of solutions catalyzed by other tin derivatives, and which are perfectly suitable for coating supports such as paper and glass fabrics.

In addition, the new organostannanes are good catalysts for converting into elastomers certain silicone oils containing a cross-linking agent, even at ambient temperature.

Apart from their use as catalysts, the new compounds are also excellent modifying agents for oils, more particularly lubricating oils, and for organic resins.

The following examples illustrate the invention.

EXAMPLE 1

Into a 5-liter, four-necked, round-bottomed flask provided with a mechanical stirrer, a reflux condenser protected from the ambient moisture by a calcium chloride tube, two dropping funnels, and a thermometer tube, are charged: 96 g. of magnesium turnings, previously washed with diethyl ether and dried: 500 cc. of deperoxidized tetrahydrofuran dried in the vapor phase with Linde 4A molecular sieves; and 1 g. of mercuric chloride.

A solution of 368 g. of ethoxymethyl chloride freed from dissolved hydrogen chloride gas by passing through Linde molecular sieves type 13X, in 500 cc. of dry tetrahydrofuran, and a solution of 325 g. of diethyldichlorostannane in 500 cc. of dry tetrahydrofuran are separately prepared, and poured into the two dropping funnels.

15 cc. of the ethoxymethyl chloride solution are first run-in, while the reaction mixture is stirred. The reaction starts at the end of 15 minutes (slight heating of the mixture and blackening of the magnesium). The two reactants are then simultaneously run-in during two hours, while the temperature of the reaction mixture is maintained between 25° and 30° C. by external cooling. The reaction mixture is then further stirred for 12 hours and poured onto a mixture of hydrochloric acid and ice. After filtration and decantation, the tetrahydrofuran is driven off from the aqueous layer by distillation, and the residual aqueous layer is extracted with 3×100 cc. of diethyl ether. The ethereal extracts are combined with the organic layer, which is then washed with water and dried over calcium chloride.

By distillation, there are isolated 256 g. (yield 67% calculated on the diethyldichlorostannane) of bis(ethoxymethyl) diethylstannane, B.P. $_{16\ mm.\ Hg}$=110.9–111° C.; $n_D^{20}$=1.4688; $d_4^{20}$=1.2114.

This bis(ethoxymethyl)diethylstannane is readily converted into bis(chloromethyl)diethylstannane by heating under reflux for 12 hours a mixture of 110 g. of the bis(ethoxymethyl)diethylstannane and 79 g. of acetyl chloride. The reaction mass is then distilled and 88 g. of bis(chloromethyl)diethylstannane are then obtained, B.P. $_{20\ mm.\ Hg}$=119–120° C.; $d_4^{20}$=1.517. Yield 80% based on the bis(ethoxymethyl)diethylstannane.

EXAMPLE 2

The reaction is carried out under the same conditions as in Example 1, but with the following reactants: 61 g. of magnesium in 100 cc. of tetrahydrofuran, with a few mercuric chloride crystals; 218 g. of ethoxymethyl chloride in 200 cc. of tetrahydrofuran; and 150 g. of triethylchlorostannane in 200 cc. of tetrahydrofuran. 88.5 g. (yield 53.5% calculated on the triethylchlorostannane) of ethoxymethyltriethylstannane are thus obtained, B.P. $_{14.5\ mm.\ Hg}=87.4–88.5°$ C.; $n_D^{20}=1.4720$; $d_4^{20}=1.2194$.

EXAMPLE 3

The procedure of Example 1 is followed, but with the following reactants: 33.6 g. of magnesium in 100 cc. of tetrahydrofuran, with a few mercuric chloride crystals; 102.5 g. of methoxymethyl chloride in 200 cc. of tetrahydrofuran; and 128.5 g. of di-n-butyldichlorostannane in 250 cc. of tetrahydrofuran; but after the reactants have been run-in, the reaction mixture is refluxed for 72 hours. After the usual working-up treatments, 35.5 g. (yield 21% calculated on the di-n-butyldichlorostannane) of bis(methoxymethyl)-di-n-butylstannane are obtained, B.P. $_{20.5\ mm.\ Hg}=146.7–147.6°$ C.; $n_D^{20}=1.4775$; $d_4^{20}=1.1881$.

EXAMPLE 4

The procedure of Example 1 is followed, starting with: 12.2 g. of magnesium in 100 cc. of tetrahydrofuran, with a few mercuric chloride crystals; 103 g. of tri-n-butylchlorostannane in 200 cc. of tetrahydrofuran; and 90 g. of ethoxymethyl chloride in 200 cc. of tetrahydrofuran; but, after the reactants have been run in, the reaction mixture is refluxed for 24 hours. After the usual working-up treatments 32 g. (yield 29% based on the tri-n-butylchlorostannane) of ethoxymethyl-tri-n-butylstannane are obtained, B.P. $_{1.4\ mm.\ Hg}=116–118°$ C.; $n_D^{20}=1.4775$; $d_4^{20}=1.503$.

EXAMPLE 5

50 g. of polydimethylsiloxane oil having a viscosity of 17,500 centipoises are mixed with 1.125 g. of ethyl polysilicate (containing 40% of $SiO_2$) and 0.7 g. of bis(ethoxymethyl)diethylstannane (prepared as in Example 1). The liquid mass obtained is placed in an aluminium cylinder 40 mm. in diameter and 12 mm. high. After 34 minutes, the surface of the mass is no longer sticky, and, after 85 minutes, the entire mass is converted into an elastic solid which can easily be removed from the mould.

EXAMPLE 6

89.5 g. of polydimethylsiloxane oil similar to that used in Example 5 are malaxated in the absence of moisture with 7.25 g. of very dry silica of combustion. The pasty mixture obtained is stored under anhydrous conditions. With exclusion of moisture, the paste is mixed with 2.9 g. of methyltriacetoxysilane and 0.02 g. of bis(methoxymethyl)dibutylstannane (prepared as in Example 3). The mixture obtained is then put in sealed tubes, and part of the mixture is spread on a glass plate in a film 0.1 mm. thick. After 20 minutes, the product is converted into an elastic, non-sticky film.

For purposes of comparison a film prepared from a similar composition, but not containing bis(methoxymethyl)dibutylstannane is incompletely vulcanized and still sticky after 30 minutes.

The mixture containing bis(methoxymethyl)dibutylstannane can be stored in a sealed tube for a long time unchanged.

I claim:

1. A compound of the formula:

$$R_nSn(CH_2OR')_{4-n}$$

where $n$ is an integer from 2 to 3, and R and R' are each selected from the class consisting of alkyl, cycloalkyl and aralkyl.

2. A compound as claimed in claim 1 in which R and R' are each selected from the class consisting of alkyl of up to 4 carbon atoms, cyclopentyl, methylcyclopentyl, cyclohexyl, methylcyclohexyl and benzyl.

3. A compound as claimed in claim 1 in which R is alkyl of up to 4 carbon atoms and R' is alkyl of up to 2 carbon atoms.

4. Bis(ethoxymethyl)diethylstannane.

5. Ethoxymethyl-triethylstannane.

6. Bis(methoxymethyl)di-n-butylstannane.

7. Ethoxymethyl-tri-n-butylstannane.

8. Process for the production of a chloromethylated organostannane which comprises reacting a compound of the formula:

$$R_nSn(CH_2OR')_{4-n}$$

where $n$ is an integer from 2 to 3, and R and R' are each selected from the class consisting of alkyl, cycloalkyl, and aralkyl with acetyl chloride.

References Cited

FOREIGN PATENTS 178,291    2/1962    Sweden.

OTHER REFERENCES

Dub, Organometallic Compounds, vol. II, Berlin, Germany, Springer-Verlag, 1961, pp. 112 and 114.

TOBIAS E. LEVOW, *Primary Examiner.*

W. F. W. BELLAMY, *Assistant Examiner.*